United States Patent
Horie et al.

(10) Patent No.: US 6,509,684 B2
(45) Date of Patent: Jan. 21, 2003

(54) CRT PANEL GLASS AND CRT, AND THEIR PRODUCTION METHODS

(75) Inventors: Noritoshi Horie, Chiba (JP); Tsunehiko Sugawara, Chiba (JP); Toshikazu Ikezawa, Chiba (JP); Takuji Oyama, Kanagawa (JP); Junnosuke Mizukami, Chiba (JP); Eiji Shidoji, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/103,810

(22) Filed: Mar. 25, 2002

(65) Prior Publication Data

US 2002/0153822 A1 Oct. 24, 2002

Related U.S. Application Data

(63) Continuation of application No. PCT/JP01/06381, filed on Jul. 24, 2001.

(30) Foreign Application Priority Data

Jul. 24, 2000  (JP) .......................................... 2000-222482
Nov. 29, 2000  (JP) .......................................... 2000-363144

(51) Int. Cl.$^7$ ................................................. H01J 31/00
(52) U.S. Cl. ..................................... 313/479; 313/477 R
(58) Field of Search ................................. 313/461, 466, 313/473, 477 R, 479; 445/58

(56) References Cited

FOREIGN PATENT DOCUMENTS

| JP | 61-185852 | 8/1986 |
| JP | 62-118302 | 5/1987 |
| JP | 5-182604 | 7/1993 |
| JP | 6-308614 | 11/1994 |
| JP | 10-177850 | 6/1998 |
| JP | 11-233050 | 8/1999 |
| JP | 11-283529 | 10/1999 |
| JP | 11-283530 | 10/1999 |
| JP | 11-307016 | 11/1999 |

Primary Examiner—Vip Patel
(74) Attorney, Agent, or Firm—Oblon, Spivak, McClelland, Maier & Neustadt, P.C.

(57) ABSTRACT

A CRT panel glass and a CRT wherein a surface treating film is formed on an outer surface of a CRT panel so that overall transmittance distribution and reflectance distribution within an effective picture plane satisfy specific mathematical expressions, whereby, even with a flattened panel glass, brightness and contrast are uniform over the entire surface of the image display plane, and their production method.

15 Claims, 7 Drawing Sheets

3a BAFFLE PLATE

DIRECTION OF MOVEMENT
OF CRT PANEL

Fig.5(a)
Fig.5(b)
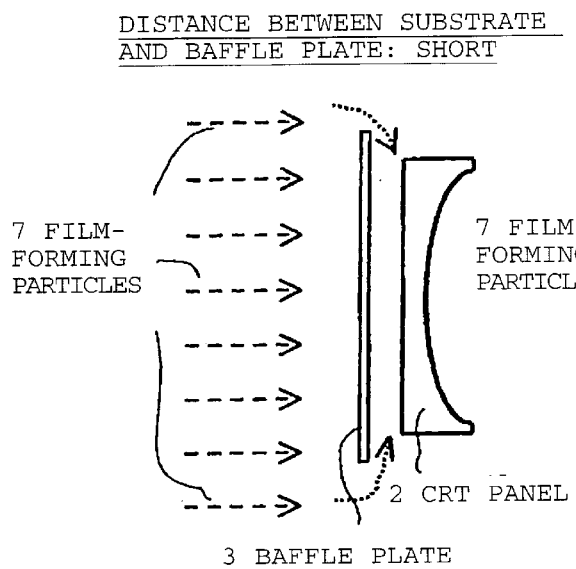
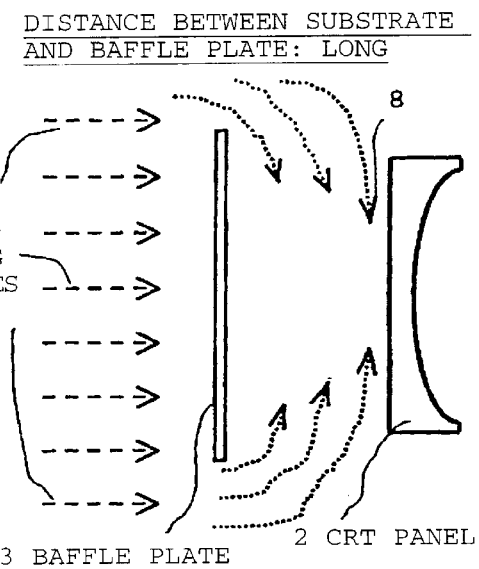
Fig.6
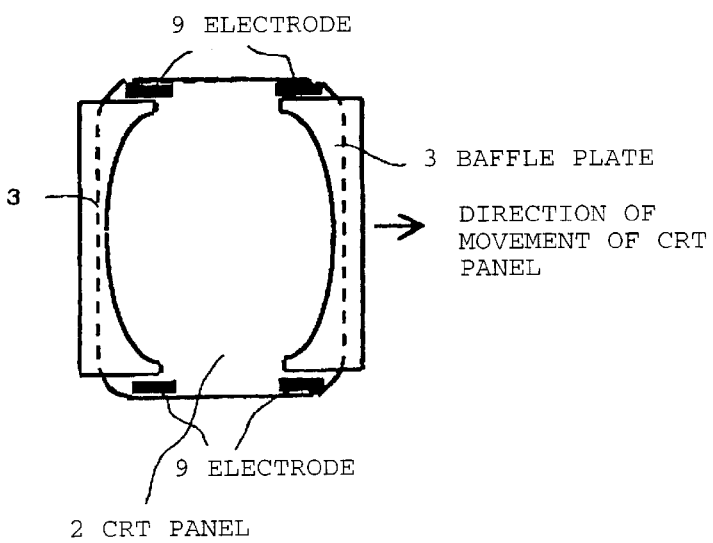

9 ELECTRODE

9 ELECTRODE

2 CRT PANEL

CRT PANEL GLASS AND CRT, AND THEIR PRODUCTION METHODS

TECHNICAL FIELD

The present invention relates to a method for producing a CRT panel glass or a CRT having improved contrast and uniformity in brightness.

BACKGROUND ART

A panel glass for CRT is required to present a uniform brightness of an image displayed in the picture plane.

As a method to display an image brightness uniformly, a method wherein the transmittance of the panel glass is made constant in the plane, or a method wherein, while a transmittance distribution is permitted to be present in the panel glass, it is corrected by an intensity distribution of an electron beam, and a distribution is imparted to the emission intensity of the phosphor, may be mentioned.

However, the latter method has a technical limit such that when a panel glass which necessarily has a thickness in glass thickness in production of television, has a large transmittance distribution, such as a transmittance distribution with a difference of at least 10% between the center portion and the peripheral portion of the panel glass, it cannot cope therewith.

On the other hand, as a conventional method wherein the transmittance of a panel glass is made constant, the glass base material is made to be transparent to eliminate the difference in the transmittance due to the thickness of the glass. However, this method cannot cope with flattening of recent panel glasses where the center portion and the peripheral portion are large, and it is difficult to make the transmittance of such panel glasses to be uniform. Further, it has been attempted to solve the above problems by increasing the transmittance of the glass base material as a panel glass provided with an antireflection film and by reducing the transmittance of the antireflection film, but there has been a problem that the internal reflection tends to be high, and a double image is likely to form. Consequently, in a case of a flattened panel glass, there have been problems such that the contrast is poor, and a double image forms, in addition to a problem that uniformity cannot be attained in the brightness of images.

Further, as another related technology, JP-A-61-185852 discloses a method wherein the total glass thickness within the display area is made constant by attaching a front panel made of glass and provided with a thickness variation on the front surface of the panel glass by a resin. However, this method has had a problem that the weight of CRT increases, or the cost increases due to the bonding of the front panel.

Further, JP-A-6-308614 discloses a projection type display wherein, in order to improve the contrast, the projection screen is made to be a colored screen having an outer light absorption characteristic on its surface, and the color density is continuously changed from the center towards the periphery, so that the brightness distribution of the screen will be uniform, as seen by an observer. This publication also discloses that a similar effect can be obtained also by providing a distribution to the thickness of the colored screen. These methods are considered to be effective as means to make the brightness over the entire surface of the display uniform by intentionally providing a transmittance distribution to the display. However, in a case where such methods are applied to a panel glass for CRT, it will be required to have a resin face or a whole area panel corresponding to the colored screen, thus leading to a problem of the weight increase or the increase of the costs, as in the case described above.

Further, JP-A-10-177850 discloses a method for making the transmittance of the center portion and the peripheral portion uniform by bonding a resin film on the front surface of a panel glass for CRT and by adopting any one of ① coloring the resin film, ② applying a colored coating on the resin film surface and ③ coloring the adhesive used for bonding the resin film to the panel glass. However, this method also has had a problem of the weight increase or the increase of the costs.

On the other hand, along with flattening of an image display plane, a problem of reflection of an outer image has newly arisen. This is caused because a flat image display plane acts as a mirror surface, and an external image is faithfully reproduced, whereby the reflection of the image is more likely to be recognized. In order to suppress this reflection of the image, it is simple and effective to apply an antireflection treatment to the image display plane. In WO00/44029, low reflection is attempted by forming a low refractive index film further on a light-absorbing film.

However, according to makeup examinations and studies by the present inventors, it has been found to be difficult to suppress reflection of the image uniformly over the entire surface of the image display plane only by providing a low refractive index film. Particularly with respect to the CRT for which a high precision image is required such as a display for computers, the reflectance in the image display plane is considered to be preferably at most 1.5%, particularly preferably at most 1.0%, however, it is very difficult to attain such a low reflectance uniformly over the entire surface of the image display plane.

FIG. 12 is a graph illustrating simulation of the relation, with respect to a glass plate having a low-reflection film comprising a light-absorbing film (titanium nitride film) and a low refractive index film (silicon oxide) formed thereon, between the light transmittance of the low-reflection film alone and the reflectance of the low-reflection film against light from the low refractive index film side. From the results of this simulation, it is found that the reflectance tends to be high along with an attempt to increase the light transmittance of the low-reflection film alone, and if light transmittance collection is carried out to make the brightness uniform, if the light transmittance is set to exceed 80% for example, the above low reflectance can not be realized.

The object of the present invention is to provide a method for producing a CRT panel glass or a CRT whereby the uniform brightness image can be seen with a good contrast, even with a flattened panel glass whereby the difference in brightness between the center portion and the peripheral portion becomes distinct especially when a colored glass is employed.

The present invention further has an object to provide a panel glass which has uniform brightness and contrast particularly over the entire surface of the image display plane, with which reflection is low and reflection of the image can be suppressed.

The present invention further has an object to provide a method for producing a CRT panel glass or a CRT, whereby the above panel glass can be obtained in a simple method at a low cost.

The present invention further has an object to provide a method for producing a CRT panel glass or a CRT having also an electromagnetic wave shielding performance.

The present invention further has an object to provide a method for producing a CRT panel glass or a CRT having also a low reflection performance.

Further, the present invention has an object to provide a method for producing a CRT panel glass or a CRT having occurrence of a double image suppressed.

Further, the present invention has an object to provide a CRT panel glass or a CRT obtained by the above production methods.

DISCLOSURE OF THE INVENTION

In order to achieve the above objects, the present invention provides the following method for producing a CRT panel glass or a CRT, and a CRT panel glass or a CRT, and the above objects of the present invention have been achieved.

1) A method for producing a CRT panel glass or a CRT, which comprises disposing baffle plates between an outer surface of a CRT panel on which a film is formed and a sputter target, and forming a surface treating film on the outer surface of said panel by a sputtering method so that the value A defined by the following mathematical expression (1) is less than 1 within an effective picture plane on the outer surface of said panel:

$$A \text{ value} = \left| \frac{1 - \frac{Tgf\ (\min)}{Tgf\ (\max)}}{1 - \frac{Tg\ (\min)}{Tg\ (\max)}} \right| \quad (1)$$

In the above mathematical expression (1):

Tg(min) and Tg(max) represent the minimum transmittance (%) and the maximum transmittance (%) of the CRT panel itself, respectively; and Tgf(max) and Tgf(min) represent the maximum transmittance (%) and the minimum transmittance (%) of an integrated body comprising the CRT panel and the surface treating film, respectively.

2) The method for producing a CRT panel glass or a CRT according to the above 1), wherein baffle plates having such a shape that the region on the outer surface of the CRT panel to which film-forming particles are adhered has such a width that the width in the outer surface width direction becomes narrow to narrow via broad continuously in a longitudinal direction of the CRT panel, are used.

3) The method for producing a CRT panel glass or a CRT according to the above 1), wherein film-forming particles are adhered on the surface treating film formed by the baffle plates as defined in the above 2), by using baffle plates having such a shape that the width in the outer surface width direction becomes broad to broad via narrow continuously in a longitudinal direction of the CRT panel.

4) A CRT panel glass or a CRT, which is obtained by the production method as defined in the above 3).

5) The CRT panel glass or the CRT according to the above 4), wherein the visible light reflectance against light incident from outside of the panel is at most 1.5% within the above effective picture plane.

6) A CRT panel glass, which comprises a surface treating film comprising a light-absorbing film and a low refractive index film laminated on the light-absorbing film, formed on an image display plane of a substrate glass having a flat image display plane and having such a light transmittance distribution that the light transmittance Tg(0) of the panel itself at the center portion of the flat image display plane and the light transmittance Tg(E) of the panel itself at a diagonal line top end corresponding to a panel effective plane end at each panel size as defined in accordance with individual standards by Electronic Industries Association of Japan EIAJ-2134B, satisfy "Tg(0)≧Tg(E)"; which has such a light transmittance distribution that the overall light transmittance Tgf(0) including the surface treating film at the center portion of the image display plane and the overall light transmittance Tgf(E) including the surface treating film at the diagonal line top end corresponding to the panel effective plane end at each panel size as defined in accordance with individual standards by Electronic Industries Association of Japan EIAJ-2134B, satisfy "Tgf(E)/Tgf(0)≧90%"; and which has such a reflectance distribution that the reflectance Rf(0) against light from the low refractive index film side at the center portion of the image display plane and the reflectance Rf(E) against light from the low refractive index film side at the diagonal line top end corresponding to the panel effective plane end at each panel size as defined in accordance with individual standards by Electronic Industries Association of Japan EIAJ-2134B, satisfy "|Rf(0)−Rf(E)|≦0.5%".

7) The CRT panel glass according to the above 6), wherein both Rf(0) and Rf(E) are at most 0.7%.

8) The CRT panel glass according to the above 6) or 7), wherein the difference between the light transmittance Tf(0) of the surface treating film alone at the center portion of the image display plane and the light transmittance Tf(E) of the surface treating film alone at the diagonal line top end corresponding to the panel effective plane end at each panel size as defined in accordance with individual standards by Electronic Industries Association of Japan EIAJ-2134B, ΔTf=|Tf(0)−Tf(E)|, is at least 2% and at most 25%.

9) The CRT panel glass according to any one of the above 6) to 8), wherein both Tf(0) and Tf(E) are at least 60% and at most 90%.

10) The CRT panel glass according to any one of the above 6) to 9), wherein the light-absorbing film is a film containing titanium nitride as the main component.

11) The CRT panel glass according to any one of the above 6) to 10), wherein the low refractive index film is a film containing silica as the main component.

12) The CRT panel glass according to any one of the above 6) to 11), wherein a layer which prevents oxidation of the light-absorbing film is interposed between the light-absorbing film and the low refractive index film.

13) The CRT panel glass according to the above 12), wherein the film thickness of the layer which prevents oxidation of the light-absorbing film is different as between the center portion of the image display plane and the diagonal line top end corresponding to the panel effective plane end at each panel size as defined in accordance with individual standards by Electronic Industries Association of Japan EIAJ-2134B.

14) A CRT having the CRT panel glass as defined in any one of the above 6) to 13).

15) A method for producing a CRT, which comprises incorporating components for CRT into the CRT panel glass as defined in any one of the above 6) to 13).

BRIEF DESCRIPTION OF THE DRAWINGS

FIG. 5 is a diagram illustrating a difference in behavior of film-forming particles toward a CRT panel due to a difference in distance between a baffle plate and a CRT panel (substrate).

FIG. 6 is a diagram illustrating use of baffle plates which are smaller than the size of a CRT panel and setting of electrodes at end portions in a longitudinal direction.

EXPLANATION OF THE REFERENCE NUMERALS

Figure 1:
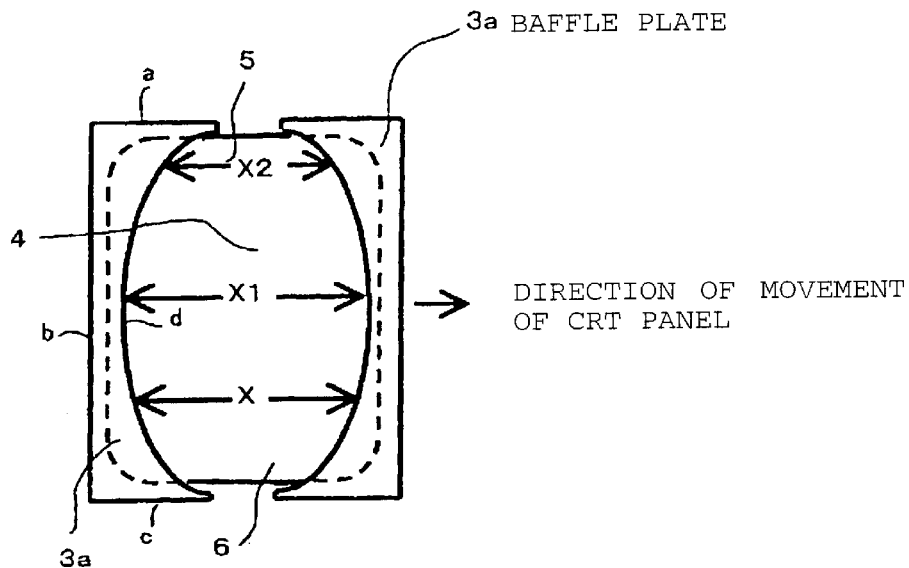
FIG. 1 is a drawing illustrating the shape of baffle plates, the positional relation between the baffle plates and a CRT panel and a production example of the present invention.

1 Surface treating film
2 CRT panel
3 3a, 3b baffle plate
4 Outer surface region
5 Higher position
6 Lower position
7 Film-forming particles
8 Getting-in
9 Electrode
a: Upper side, b: long side, c: lower side, d: arc, e: maximum width
10 Panel glass
11 Substrate glass
12 Light-absorbing film
13 Low refractive index film
14 Oxidation barrier layer

BEST MODE FOR CARRYING OUT THE INVENTION

The present invention is characterized in that baffle plates are disposed between an outer surface of a CRT panel on which a film is formed and a sputter target, and a surface treating film is formed on the outer surface of said CRT panel by a sputtering method. In the present invention, the CRT panel includes an independent CRT panel glass and a panel glass provided on a CRT. Further, the CRT is a cathode ray tube comprising a complete panel glass and a funnel or neck tube attached to the panel glass.

In the present invention, an apparatus to which the sputtering method is applied, preferably has a fixed sputter target and preferably has a means to move the CRT panel and make it pass in front of the sputter target. It may, for example, be "in-line" type or "rotating drum" type.

With an in-line type film-forming apparatus, at the time of film formation, CRT panels are set in a constant direction to a jig called a carrier which transports substrates and moved in front of a necessary cathode to form a necessary film. Further, with a rotating drum type, a rotating drum having substrate CRT panels fixed so that the panels face outside, is passed in front of a target disposed on the wall surface side to form a film.

By disposing baffle plates having a desired shape in front of the CRT panel as in the present invention, the film thickness distribution can easily be provided at a low cost with excellent productivity.

Usually the in-line type sputtering apparatuses are divided into a deposition-up system wherein a cathode is fixed on the lower side, and a CRT panel fixed so that a plane to be surface-treated faces downside is moved to form a film from the bottom up, and a deposition-down system wherein a cathode and a CRT panel are disposed upside down. The deposition-up system is effective for film formation in an electronic component field for which a high film formation quality is required (dust and drawbacks have to be reduced as far as possible).

In the deposition-up system, a CRT panel and baffle plates are maintained so that their longitudinal directions are parallel to each other and parallel in a horizontal direction, and while moving the CRT panel in the horizontal direction, film-forming particles are adhered to the outer surface of the CRT panel from bottom and approximately perpendicular direction.

Further, a "vertical" system wherein a cathode and a CRT panel are set so that they face each other, is also effective for film formation for which a high film formation quality is required.

The baffle plates can easily be applied similarly in any case in the present invention.

As the cathode to be used, a magnetron type DC (direct current) cathode or a RF (radio-frequency) cathode may be mentioned. Further, as the shape of the cathode, a cylindrical type may, for example, be mentioned.

Now, the method as illustrated in FIG. 1 will be specifically explained. This method can similarly be applied to both deposition-up system and deposition-down system.

The method of FIG. 1 is a vertical system. Namely, the CRT panel and the baffle plates are maintained so that their longitudinal directions are parallel to each other and parallel to the gravity direction, and while moving the CRT panel vertically to the gravity direction, film-forming particles are adhered to the outer surface of the CRT panel from an approximately vertical direction. In FIG. 1, when the gravity direction is in a direction parallel to the paper plane and from a higher position 5 to a lower position 6, this method is to spray film-forming particles to the paper plane approximately vertically and to make the particles be adhered on the outer surface of the CRT panel while moving the CRT panel in a direction indicated by an arrow.

The shape of the baffle plates is determined by varying the shape depending upon the film thickness distribution of the film to be formed.

Figure 3:
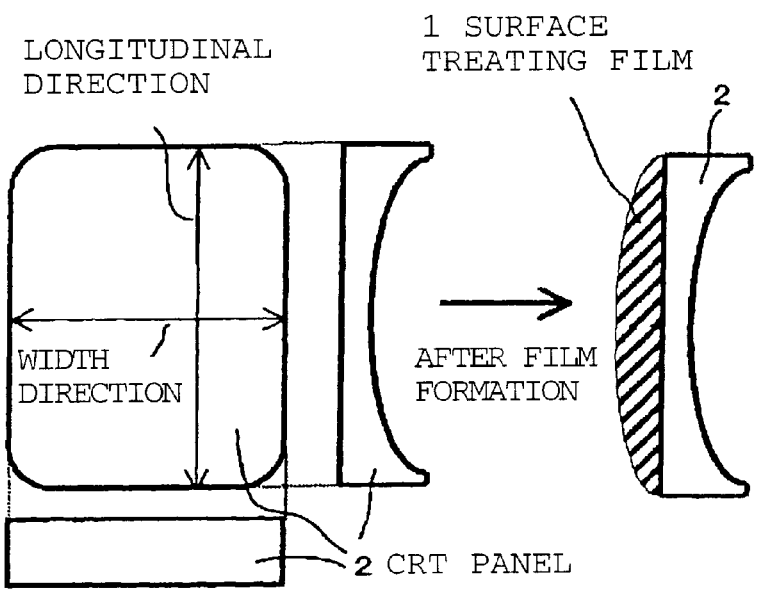
FIG. 3 is a cross-sectional view illustrating cross-section shape by a vertical surface along a longitudinal direction of a surface treating film formed by the baffle plates as shown in FIG. 1.

In a case where a film thickness distribution of the surface treating film 1 having a shape as illustrated in FIG. 3 (such a film thickness distribution that the film is thick at the center portion and gradually becomes thin towards the periphery) is obtained on an outer surface of a CRT panel 2, the shape of a pair of baffle plates 3a as illustrated in FIG. 1 may be employed. Namely, the shape of the pair of baffle plates is such that the outer surface region 4 of the CRT panel to which film-forming particles are adhered has such a width that the width X in the outer surface width direction becomes narrow to narrow via broad continuously from a higher position 5 to a lower position 6 of the CRT panel, namely, the shape is so-called a concave lens cross-sectional plate shape. The baffle plate 3a is a plate having a plane surrounded by an upper side a, a long side b, a lower side c and an arc d. The long side b is at a level of the length of the CRT panel in a longitudinal direction (long side), and the upper side a and the lower side c are at a level of from one fifth to half of the length of the CRT panel in a width direction (short side), and by selecting these elements and the curvature of the arc d, various shapes of the baffle plates may be adjusted. Then, the baffle plates 3a, 3a are set between the CRT panel 2 and a sputtering target so that the arcs d face each other, the interval (X) becomes maximum (X1) at the center of the CRT panel 2 and gradually becomes narrow toward both ends (X2). Further, a pair of baffle plates 3a, 3a may be connected at the upper side a and the lower side c and integrated.

As the material of the baffle plates 3a, they are preferably made of a metal, made of a ceramic or made by applying a surface treatment to a metal with a ceramic. The metal may, for example, be aluminum or stainless, and the ceramic may, for example, be alumina ($Al_2O_3$), titanium nitride (TiN) or titanium carbide (TiC). The thickness of the baffle plates is at a level of from 1 to 10 mm.

Figure 4:
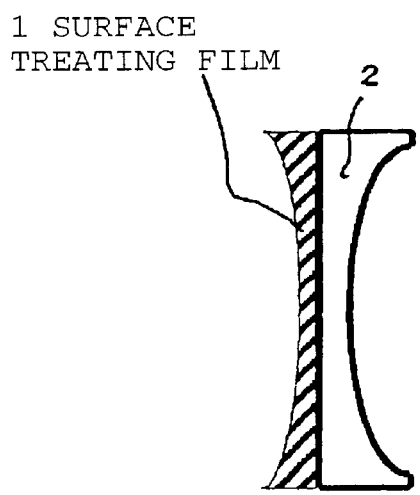
FIG. 4 is a cross-sectional view illustrating cross-section shape by a vertical surface along a longitudinal direction of a surface treating film formed by the baffle plates as shown in FIG. 2.

The surface treating film 1 as shown in FIG. 4 is preferably formed on the surface treating film 1 as shown in FIG. 3 to constitute a two-layer structure, and it is preferred that the former is a low refractive index film as described hereinafter, and the latter is a light-absorbing film as described hereinafter, and by employing such a film thickness distribution of a light-absorbing film, the difference between the transmittance Tgf at the peripheral portion of the CRT panel and the transmittance Tgf at the center portion becomes extremely small, and the entire CRT panel have a uniform transmittance Tgf.

Figure 2:
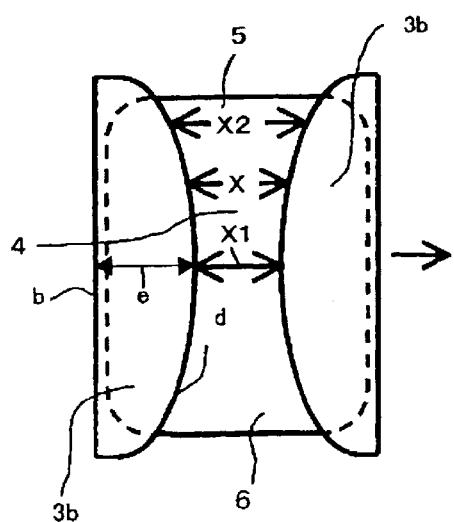
FIG. 2 is a drawing illustrating the shape of baffle plates, the positional relation between the baffle plates and a CRT panel and a production example of the present invention.

In a case where a film thickness distribution of the surface treating film 1 having a the shape as illustrated in FIG. 4 (such a film thickness distribution that the film is thin at the center portion and gradually becomes thick towards the periphery) is formed on the outer surface of the CRT panel 2, the shape of a pair of baffle plates 3b as illustrated in FIG. 2 may be employed. Namely, the shape of the pair of baffle plates is such that the outer surface region 4 of the CRT panel to which film-forming particles are adhered has such a width that the width X in the outer surface width direction becomes from broad to broad via narrow continuously from a higher position 5 to a lower position 6 of the CRT panel, namely, the shape is so-called a convex lens cross-sectional plate shape. The baffle plate 3b is a plate having a plane surrounded by a long side b and an arc d, and having a maximum width e. The long side b is at a level of a length of the CRT panel in a longitudinal direction (long side), the maximum width e is at a level of from one fifth to half of the length of the CRT panel in a width direction (short side), and by selecting these elements and the curvature of the arc d, various baffle plate shapes may be adjusted. Then, the baffle plates 3b, 3b are disposed between the CRT panel 2 and a sputtering target (on this side of the paper plane) so that the arcs d face each other, the interval (X) becomes minimum (X1) at the center of the substrate glass 11 and gradually becomes broad toward both ends (X2).

The baffle plates as illustrated in FIGS. 1 and 2 are disposed in front of the CRT panel, i.e. they are disposed on the side which faces the spray direction of film-forming particles to mask the CRT panel, the baffle plates are fixed, and while moving a large number of aligned CRT panels in a direction indicated by an arrow, film-forming particles are adhered on the outer surface of the CRT panels, whereby the film thickness distribution of the surface treating film can easily and efficiently be controlled with a good yield.

The size and shape of the baffle plates relates to the film forming range also, but are determined corresponding to the size of the CRT panel and the size of the effective picture plane. Usually, the film forming range is a range which covers at least the effective picture plane. Particularly in a case where e.g. electrodes 9 are set to an electrically conductive layer of the surface treating film at the peripheral portion in a CRT panel longitudinal direction, baffle plates which are smaller than the size of the CRT panel may intentionally be used, and the film thickness at the longitudinal direction end portions may intentionally be made thick in some cases. These end portions are preferably outside the effective picture plane as described hereinafter. The electrodes 9 are connected with an earth, discharge a charge to the earth, and provide electromagnetic wave shielding and antistatic effects. In FIG. 6 is shown this model.

As mentioned above, the shape of the baffle plates 3a, 3b are prepared by limiting the width X, particularly the width X1 and the width X2 as parameters in a width direction against the longitudinal direction on the outer surface region 4 as illustrated in FIGS. 1 and 2. The position of the width X2 corresponds to the position of the end portion of the effective picture plane in a longitudinal direction, and the position of the width X1 corresponds to the position at the center portion of the effective picture plane in a longitudinal direction.

As described above, it is found that the film thickness distribution of the surface treating film 1 is determined by the rate of travel of a carrier, the amount of film-forming particles applied to the outer surface region and the width X (i.e. the size and shape of the baffle plates and the CRT panel), and the desired film thickness distribution can be obtained by selecting these parameters.

With respect to the design of the baffle plates, the impact of factors such as a gas ratio and introduction power as a discharge condition at the time of sputtering on the film forming rate is preliminarily examined. Then, from the relation with the rate of travel of a carrier (substrate glass), the rate of travel of a carrier and the introduction power to form a required film thickness are determined taking the productivity into consideration finally. Here, the width X1 and the width X2 of both baffle plates are determined from the required film thickness at the center portion (required transmittance Tgf at the center portion), the required film thickness at the peripheral portion (required transmittance Tgf at the peripheral portion) and reflection properties, and the entire shape of the baffle plates is designed.

With respect to the distance between the baffle plate and the CRT panel (substrate), in order to efficiently reflect the designed baffle plate shape, this distance is preferably as short as possible for easiness in control. This is because getting-in 8 of film-forming particles 7 into between the baffle plate and the CRT panel can be prevented. Practically, it is preferred to maintain a distance of at least 3 mm taking deformation of the baffle plates due to radiant heat by plasma at the time of film formation into consideration. On the contrary, if the distance between the baffle plate and the CRT panel becomes long, the film-forming particles tend to get in greatly, whereby it tends to be difficult to control the film thickness. Practically, at a level of 300 mm is the upper limit at which the film thickness can be controlled. These conditions are shown in FIGS. 5 (a) and (b). It is preferably at least 5 mm and at most 100 mm.

Now, the surface treating film to be formed on the outer surface of the CRT panel and the sputtering method for producing it will be explained below. As the surface treating film, the following construction may, for example, be preferably mentioned.

(i) A construction in which a light-absorbing film and a low refractive index film are formed in this order on a CRT panel.

(ii) A construction in which a light-absorbing film, an oxidation barrier film (a film which prevents oxidation of the light-absorbing film) and a low refractive index film are formed in this order on a CRT panel.

(iii) A construction in which a light-absorbing film, a high refractive index film, a light-absorbing film and a low refractive index film are formed in this order on a CRT panel.

Namely, a construction comprising two layers of a light-absorbing film and a low refractive index film, and having an oxidation barrier film between the light-absorbing film and the low refractive index film as the caser requires, and a construction comprising four layers of a light-absorbing film, the high refractive index film, a light-absorbing film and a low refractive index film, and having an oxidation barrier layer between the light-absorbing film and the low refractive index film as the case requires, may be mentioned. In the present invention, the former construction is particularly preferred.

For the above light-absorbing film, it is preferred to use a material which substantially reduces the surface reflectance outer light by a light interference effect with the low refractive index layer formed thereon, whereby the contrast of an image on the CRT panel will be excellent.

Further, the light-absorbing film is preferably electrically conductive. Due to the electrical conductivity, an antistatic effect of CRT or prevention of leakage of electromagnetic waves from the interior of interior CRT can be attained, such being desirable.

As a light-absorbing film to satisfy such characteristics, one containing, as the main component, at least one metal selected from the group consisting of gold, copper, titanium, zirconium and hafnium, or a nitride of said metal (excluding gold) may, for example, be mentioned.

Among them, preferred is one containing, as the main component, a nitride of at least one metal selected from the group consisting of titanium, zirconium and hafnium, from the viewpoint of the refractive index in a visible light region and dispersion relation of an extinction coefficient, and it has a characteristic that the low reflection region in the visible light region (against light (outer light) from the film side) will be broadened by the light interference action with the low refractive index film as an upper layer. Further, the film containing, as the main component, a nitride of at least one metal selected from the group consisting of titanium, zirconium and hafnium, is preferred also from the viewpoint of the heat resistance, the chemical resistance or the abrasion resistance.

In a case where two or more materials are used for the light-absorbing film, (1) they may be employed as a composite material, or (2) films made of different materials may be laminated so that the total film thickness (the geometrical film thickness, the same applies hereinafter) will be preferably from 5 to 25 nm.

Further, a light-absorbing film containing titanium nitride as the main component (hereinafter sometimes referred to simply as titanium nitride film) is particularly preferred also from the viewpoint of productivity and reproducibility, since the value of its optical constant in a visible light region matches well with the low refractive index film (particularly silica film) to reduce the reflectance, and the value of the absorption coefficient is proper, and the film thickness to obtain a proper light absorptance will be within a range of from a few nm to a few tens nm.

Further, as a low refractive index film, a film having a refractive index of from 1.35 to 1.7 is preferred. As the low refractive index film, a film containing silica as the main component (particularly a silica film) is preferred. The refractive index of the silica film is preferably from 1.46 to 1.52 (particularly preferably from 1.46 to 1.47), and the film thickness of the silica film is preferably from 70 to 130 nm, whereby the low reflection wavelength region can be adjusted to the center portion of the visible light region. The silica film is preferably used also in view of mechanical and chemical durability.

The film thickness of the silica film is particularly preferably more than 80 nm and at most 120 nm. If the film thickness of the silica is at most 80 nm, the reflectance on a long wavelength side tends to be high, and if it exceeds 120 nm, the rising of the reflectance on a short wavelength side tends to shift toward the long wavelength side.

Figure 8:
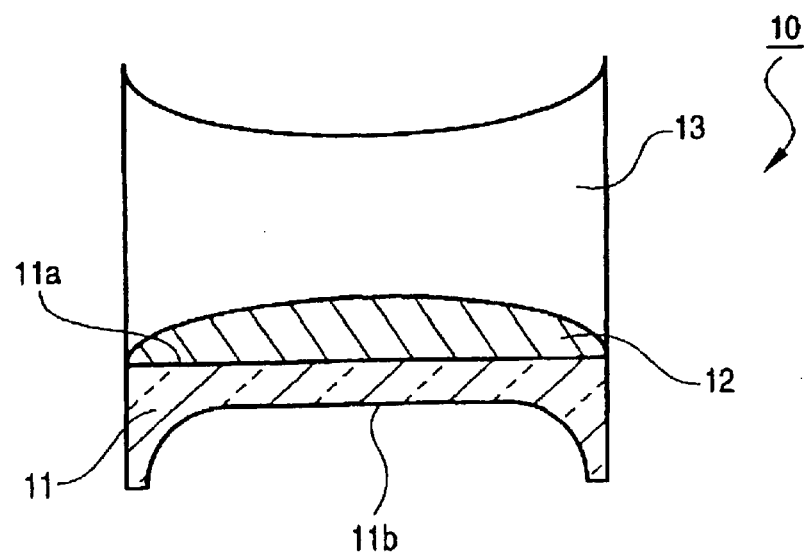
FIG. 8 is a cross-sectional view illustrating one mode of the glass panel of the present invention.

FIG. 8 is a cross-sectional view illustrating one mode of the panel glass 10 of the present invention. On a substrate glass 11, a light-absorbing film 12 and a low refractive index film 13 constituting a surface treating film are sequentially formed. Of the substrate glass 11, an image display plane 11a is a plane having a curvature radius of at least 10,000 mm, for example, and a rear surface 11b has such a curved face that the thickness at the center portion is thinnest, and the thickness at the diagonal line top end is thickest. By having such a cross-sectional shape, the substrate glass 11 has such a light transmittance distribution that the light transmittance Tg (0) at the center portion of the image display plane 11a and the light transmittance Tg (E) at the diagonal line top end satisfy Tg(O)≧Tg(E), i.e. such a light transmittance distribution that the transmittance reaches a maximum at the center portion and gradually decreases towards the periphery.

The light-absorbing film 12 is a film which collects the light transmittance distribution with the above substrate glass 11 and makes the light transmittance uniform over the entire surface of the image display plane 11a, so as to make the brightness uniform, whereby the good contrast of an image can be obtained.

It may happen that the desired properties cannot be obtained for a reason such that at the time of forming a silica film as a low refractive index film after forming the light-absorbing film on a CRT panel, said light-absorbing film undergoes oxidation, or said light-absorbing film undergoes oxidation in the heat treatment after the film forming.

Figure 10:
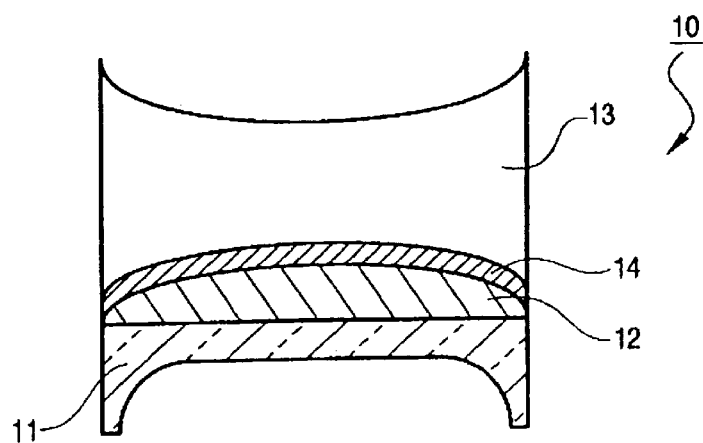
FIG. 10 is a cross-sectional view illustrating another mode of the glass panel of the present invention.

Accordingly, a layer to prevent oxidation of the light-absorbing film (oxidation barrier layer 14) may be inserted between said light-absorbing film and the silica film as illustrated in FIG. 10, whereby oxidation during the film forming can be prevented, and the heat resistance can be improved.

The oxidation barrier layer is a thin film to be formed to prevent oxidation of another layer formed therebeneath, and has optically no significance.

Figure 13:
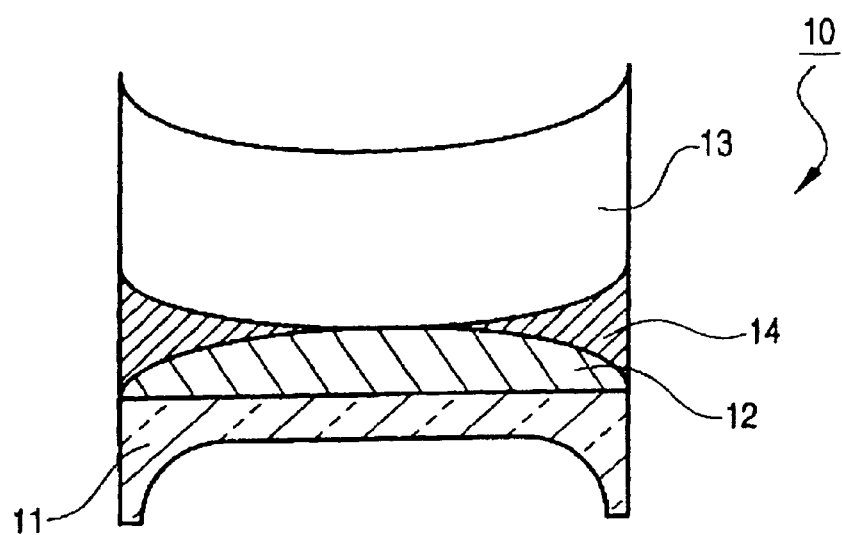
FIG. 13 is a cross-sectional view illustrating still another mode of the glass panel of the present invention, and is a cross-sectional view illustrating the panel glass prepared in Example 3.

In FIG. 10, an oxidation barrier layer 14 is formed on a light-absorbing film 12 in a uniform film thickness. Further, the oxidation barrier layer 14 may have a film thickness distribution as illustrated in FIG. 13, and such a film thickness distribution can be realized by sputtering film formation by using baffle plates as illustrated in FIG. 2.

As the oxidation barrier layer 14, various metal films and metal nitride films are suitable. The film thickness is preferably at most 20 nm so as not to impair the inherent antireflection performance. Further, if the film thickness of the oxidation barrier layer 14 is less than 1 nm, improvement of the heat resistance may be inadequate. Accordingly, it is preferred to insert an oxidation barrier layer 14 having a film thickness of from 1 to 20 nm, whereby the heat resistance can effectively be improved.

As described above, the oxidation barrier layer 14 has optically no significance, and is a layer which is not required optically. Accordingly, it may happen that by the insertion of this layer, the antireflection performance against outer light deteriorates. Especially when the oxidation barrier layer 14 is light absorptive (such as light-absorptive silicone), the thickness of the oxidation barrier layer 14 is preferably at most about 5 nm from the viewpoint of the antireflection performance.

In a case where a transparent oxidation barrier layer 14 is used, the allowable film thickness varies depending upon the refractive index of this layer. The allowable film thickness becomes maximum when a material having a refractive index of about 2.0 (such as silicon nitride or aluminum nitride) is used, and an oxidation barrier layer up to about 20 nm can be inserted between the light-absorbing film as a lower layer and the low refractive index film as an upper layer, while maintaining the low reflection characteristics against outer light.

As the oxidation barrier layer 14, a film having a composition different from the light-absorbing film is used, and specifically, it is preferred to use a film containing, as the main component, at least one metal selected from the group consisting of chromium, molybdenum, tungsten, vanadium, niobium, tantalum, zinc, nickel, palladium, platinum, aluminum, indium, tin and silicon or a film containing a nitride thereof as the main component, or a film containing, as the main component, at least one metal selected from the group consisting of titanium, zirconium and hafnium, whereby adequate improvement of the oxidation-preventing performance and maintenance of excellent antireflection characteristics can both be attained.

Especially, a film containing silicon as the main component or a film containing silicon nitride as the main component is excellent in oxidation barrier performance, and it is advantageous from the viewpoint of the production in that it is not required to increase the target material when the upper layer silica film as the low refractive index film is formed by a sputtering method (reactive sputtering method) by using an electrically conductive Si target.

Especially when a film containing titanium nitride as the main component is used as the light-absorbing film 12 and a silica film is used as the low refractive index film 13, such an effect can be obtained that an adhesive force between the titanium nitride film and the silica film improves by using a silicon nitride film as the oxidation barrier layer 14.

As a means to form the surface treating film (the light-absorbing film, the low refractive index film or the oxidation barrier film) on the CRT panel, a sputtering method, an ion plating method, a vacuum vapor deposition method or a CVD method may, for example, be employed. The sputtering method has such an advantage that a film formation over a large area is easy and the film thickness distribution can easily be corrected. By the spray method, irregularities remain on the surface of the film, thus causing non-uniformity in brightness, but by a sputtering method, the surface of the film is smooth, and a uniform brightness image can be obtained. Particularly preferred is to employ an in-line type which is excellent in the productivity, since a good film quality and uniformity of the film quality can easily be attained. Particularly preferred is a DC (direct current) magnetron type sputtering method in view of productivity, whereby modification of the apparatus to a large size is easy.

In a case where one containing a metal nitride as the main component is used as the light-absorbing film 12, if a film containing a nitride as the main component is used as the oxidation barrier layer 14, the light-absorbing film and the oxidation barrier layer 14 can be formed in the same gas atmosphere. This is a substantial merit, when a film formation installation for practical sputtering is considered.

Namely, when a so-called in-line type sputtering apparatus excellent in mass production is considered, these light-absorbing film 12 and oxidation barrier layer 14 can be formed within the same chamber (hereinafter referred to as chamber A). Accordingly, a chamber for gas separation may be formed only between the chamber A and a chamber for the low refractive index film 13 to be sequentially formed thereon, such being very efficient.

Especially when a film containing titanium nitride as the main component is used as the light-absorbing film, a silicon nitride film is used as the oxidation barrier layer and a silica film is used as the low refractive index film, an effect of improving the adhesive strength of the silica film as an outermost layer with the titanium nitride film can be obtained.

Further, to form the light-absorbing film 12 and the low refractive index film 13 with the above film thickness distributions, respectively, in a case of film formation by sputtering, for example, sputtering may be carried out by disposing a film thickness correcting plate (also called a mask or a baffle plate) between a substrate glass 11 and a sputtering target. Namely, to form the light-absorbing film 12 with a film thickness distribution of an approximately semicylindrical shape as illustrated in FIG. 8, sputtering is carried out by using a pair of baffle plates 3a, 3a as illustrated in FIG. 1 for example. Here, in the Fig., the substrate glass 11 (CRT panel) moves from the left side to the right side on the paper plane as indicated by an arrow, and sputter particles fly from a sputtering target (from this side of the paper plane) towards the substrate glass 11 approximately perpendicularly. Further, the gravity applies in a direction in parallel with the paper plane, from the upper side of the paper plane towards the lower side of the paper plane.

Figure 11:
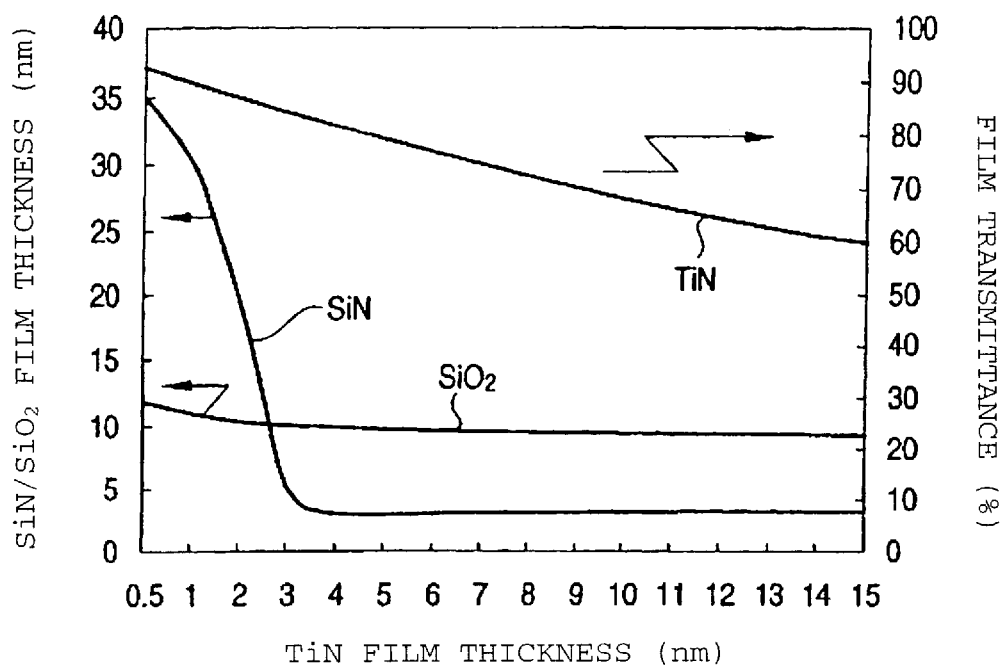
FIG. 11 is a graph illustrating simulation of a change in the light transmittance by the film thickness of silicon nitride (oxidation barrier layer).
Figure 12:
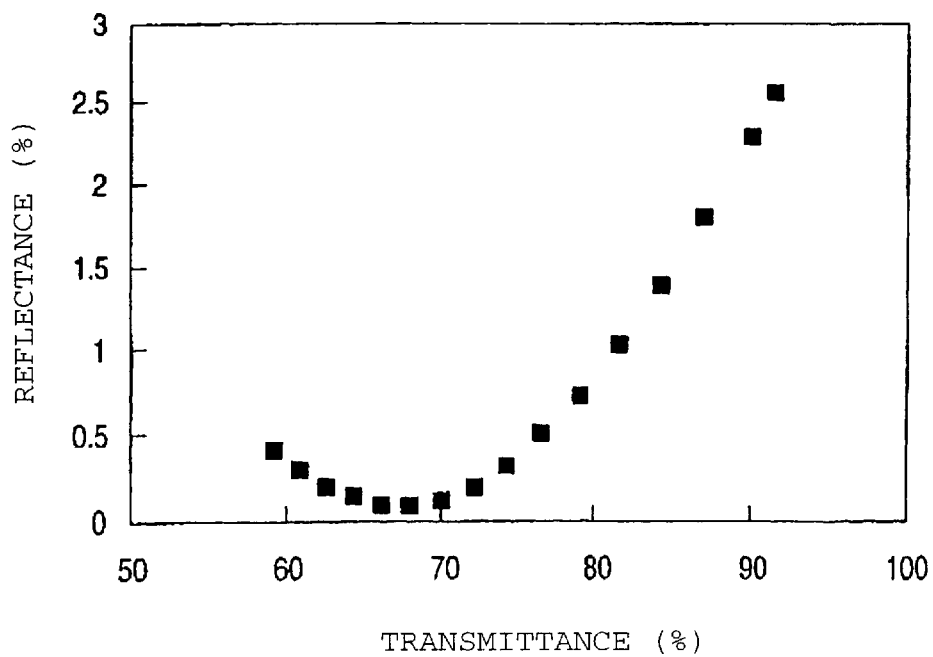
FIG. 12 is a graph illustrating simulation of the relation between the light transmittance and the film face reflectance of a glass plate having a titanium nitride film (light-absorbing film) and a silica film (low refractive index film) formed thereon.

Further, in the present invention, a distribution is provided also to the film thickness of the oxidation barrier layer 14, whereby it becomes possible to control the reflectance in further detail. The film thickness distribution is preferably approximately the same as the low refractive index film. FIG. 11 illustrates the film thicknesses of a silica film and a silicon nitride film with which a low-reflection film comprising a titanium nitride film (light-absorbing film), the silicon nitride film (oxidation barrier layer) and the silica film (low refractive-index film) gives an optimum low reflection performance, when the silicon nitride film is selected as the oxidation barrier layer 14 and the titanium nitride film has a certain film thickness. In a case where distribution is provided to the film thickness of the oxidation barrier layer 14, the respective film thicknesses are read from this graph so that the film face reflectance becomes minimum to conduct a film design.

In the CRT panel produced by the present invention, the surface treating film is formed on the glass, so that the value A defined by the above expression (1) is less then 1, preferably at most 0.85, more preferably at most 0.7, particularly preferably at most 0.5, as the overall transmittance distribution within the effective picture plane.

Further, in the present invention, the visible light reflectance against light incident from the outside of the panel is preferably at most 1.5%, particularly preferably at most 0.7%, within the effective picture plane. The visible light reflectance is as defined in JIS R3106, and is equivalent to the film face reflectance Rf.

Here, the effective picture plane is defined in accordance with the provisions of the standards by Electronic Industries Association of Japan EIAJ ED-2136 A (the effective dimensions and effective areas of CRT glass valves). The overall transmittance is a transmittance of an integral body comprising the CRT panel and the surface treating film. The overall transmittance is represented by Tgf.

Further, Tg represents the transmittance of the CRT panel, and Tg (max) and Tg (min) represent the maximum transmittance and the minimum transmittance of the CRT panel itself, respectively.

Tgf (max) and Tgf (min) represent the maximum transmittance and the minimum transmittance of an integral body comprising the CRT panel and the surface treating film, respectively. In other words, Tgf (max) and Tgf (min) represent a maximum value and a minimum value of the overall transmittance, respectively.

Further, these are values within the effective picture plane of the CRT panel.

The value A defined by the above expression (1) is an index for the transmittance distribution of the CRT panel, and the smaller this value, the higher the improvement in the transmittance distribution of the CRT panel of the present invention by the surface treating film. The value Tg (max) to obtain the value A is usually obtained at the center portion of the CRT panel, Tg (min) is obtained at the periphery thereof, and the difference is large. In the present invention, the difference in distribution of Tgf is minimized over the entire surface of the CRT panel by the surface treating film, and the difference between Tgf (max) and Tgf (min) is also small. Namely, in the present invention, the relation of Tg (min)/Tg (max)<Tgf (min)/Tgf (max) is satisfied.

In order that the value A is less than 1, as described above, a surface treating film having such a film thickness distribution with a transmittance distribution reverse to the transmittance distribution of the CRT panel itself, is formed on the outer surface of the CRT panel by disposing the above baffle plates. Usually, at least a surface treating film (particularly a light absorbing film) having a transmittance difference reverse to the transmittance difference between the center and the periphery of the CRT panel, as illustrated in FIG. 3, is usually formed.

With respect to the formation of the film thickness distribution, the film thickness distribution in a longitudinal direction of the CRT panel can be provided by the above method, whereby the in-plane distribution of the overall transmittance can be minimized.

There will be no problem even if no film thickness distribution is provided in a width direction of the CRT panel.

A film thickness distribution may be formed two dimensionally by providing a film thickness distribution in a width direction as the case requires. As a means to provide a film thickness distribution in a width direction, ① a method of obtaining a film thickness distribution in a width direction by interlocking the advancing direction of the CRT panel and the electric power applied to the target, or ② a method of obtaining a film thickness distribution in a width direction by fixing a mask having a shape similar to a punching metal (or a honeycomb) to a carrier and changing the numerical aperture in a width direction, may, for example, be considered. In the case of the method of ②, it is necessary to take the distance between said mask and the CRT panel long so that the mask shape will be reflected to the film thickness on the outer surface of the CRT panel in a sufficiently blurred shape.

Further, ③ it is possible to provide a film thickness distribution by controlling the film formation conditions together with designing the shape to let the above baffle plates have a two dimensional distribution.

In order to provide a two dimensional film thickness distribution in a longitudinal direction and a width direction of the outer surface of the CRT panel on the surface treating film, it is preferred to employ a method of providing a film thickness distribution by a combination of baffle plates for formation of the film thickness distribution in a longitudinal direction attached to a cathode side and the above method ②. The method for providing a two dimensional film thickness distribution to the surface treating film is effective particularly in a case where the glass thickness of the CRT panel has a two dimensional distribution.

Even in a case where the glass thickness of the CRT panel has a one-dimensional distribution in a longitudinal direction (such as a cylindrical type CRT panel) or a case where the thickness of the CRT panel has a two-dimensional distribution in a longitudinal direction and in a width direction (such as a CRT panel having a flat outer surface), a one-dimensional film thickness distribution in a longitudinal direction can be provided to the surface treating film solely by the above-described baffle plates for the cathode side. In this case, if a film thickness distribution is provided in the longitudinal direction, the film thickness in a width direction will be substantially constant.

Namely, as illustrated in FIG. 3, a film thickness distribution is provided in a longitudinal direction, while the film thickness will be substantially constant in a width direction. Namely, the film thickness distribution will be a "semicylindrical shape" such that the cut surface by a vertical surface along the longitudinal direction to the outer surface of the CRT panel is the same at an optional position in a width direction, whereas the cut surface by a vertical surface along the width direction is substantially rectangle, and the height changes according to the position in the longitudinal direction. By providing such a film thickness distribution, the decrease of the transmittance at the center portion of the CRT panel will be larger than end portions, whereby uniformalization of the transmittance can be attempted.

Figure 7:
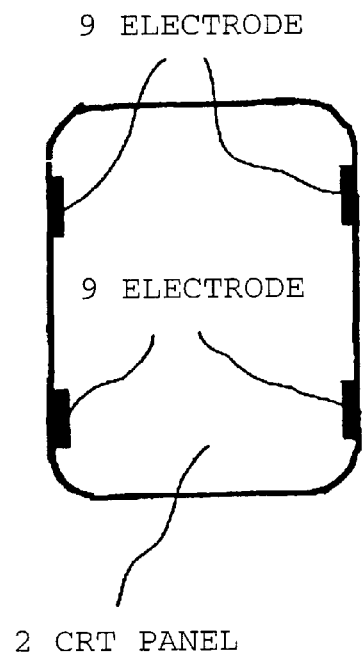
FIG. 7 is a diagram illustrating of setting of electrodes at peripheral portions on a long side of a CRT panel.

In the present invention, it is effective to provide a distribution to the film thickness of the surface treating film, for the purpose of accomplishing the object of the present invention. In such a case, the film thickness distribution of the light-absorbing film of the surface treating film is preferably made to be a "semicylindrical shape". With such a film thickness distribution, when electrodes are provided at long side peripheral portions as illustrated in FIG. 7, the film thickness of the light-absorbing film (the conductive film) at the peripheral portion corresponding to the end portion in a width direction is not thin, whereby a low resistance required for electromagnetic wave shielding can be maintained. The surface resistance of the film at the portion where the electrode is provided is preferably at most 1 k$\Omega$/□.

In order to further improve the uniformity of the overall transmittance within the effective picture plane while maintaining the antireflection effect, the difference between the minimum transmittance Tf (min) of the surface treating film (not including the glass substrate) and the maximum transmittance Tf (max) of the surface treating film is preferably within a range of from 2 to 20%. Here, the transmittance Tf of the surface treating film is a transmittance of the above entire layer structure constituting the surface treating film. Here, Tf is a value as defined by Tgf/Tg.

Further, when Tgf (min)/Tgf (max) is preferably at least 0.8, more preferably at least 0.9, the display brightness within the picture plane will be uniform.

Tg (max) is preferably at most 70%, particularly preferably from 30 to 70%, with a view of eliminate occurrence of a double image of the CRT panel.

In a case where Tg (max) is less than 30%, Tf is required to be high to bring the overall transmittance to a practical value, and the surface treating film (particularly the conductive light-absorbing film) has to be made thin, such being undesirable from the viewpoint of the electrical conductivity. On the other hand, if it exceeds 70%, it will be necessary to make the light-absorbing film thick, whereby occurrence of a double image due to reflection from the glass/film interface (as viewed from the glass side) will be problematic. From the same reason, as the more preferred range, Tg (max) is preferably within a range of from 35 to 65%, particularly preferably from 35 to 60%. In such a case, Tgf is preferably adjusted to be from 25 to 50%, from the viewpoint of brightness and contrast.

The reflectance (the internal reflectance) as observed from the inside of the CRT panel is preferably at most 15%, such being effective for elimination of occurrence of a double image. It is particularly preferably at most 10%. Further, this reflectance is an overall reflectance attributable to the reflection from the interface between the surface treating film and the CRT panel, and the reflectance from the interface between the CRT panel and the front air.

To adjust the above reflectance within the above range, it is preferred to provide, as the surface treating film, a layer containing titanium nitride as the main component as a light-absorbing film further and a layer containing silicon oxide as the main component as a low refractive index film on said light-absorbing film. Further, it is also preferred to provide an oxidation barrier layer between the light-absorbing film and the low refractive index film.

Further, with this film construction, it is preferred to provide a film thickness distribution to the low refractive index layer (in some cases, also to the oxidation barrier layer) in order to maintain the optical characteristics, particularly the low reflection performance to outer light in the visible light region. In this case, the low refractive index layer preferably has a film thickness distribution reverse to the light-absorbing layer, i.e. a film thickness distribution as illustrated in FIG. 4. This is effective to return to the initial state the spectral reflection spectrum shifted towards the short wavelength side as the light-absorbing film is thin at the peripheral portion, by increasing the film thickness of the upper layer, and this is accomplished by the use of the baffle plates having a shape as illustrated in FIG. 2. It is easily accomplished by an in-line type sputtering method to let the lower layer and the upper layer have reversed film thickness distributions. Namely, in the film forming space for each target, a baffle plate may be installed to provide the respective specific film thickness distribution. To provide a film thickness distribution reverse to the lower layer (light-absorbing film) to the upper layer, is effective for in-plane uniformity of the reflection color tone or in-plane uniformity of the transmittance distribution.

The layer containing titanium nitride as the above light-absorbing film, preferably contains a trace amount of oxygen.

Further Tgf (max) is preferably within a range of from 30 to 70%, particularly from 35 to 65%. With a surface treating film having the above construction (i) or (ii), in order to make the in-plane reflectance to be at most 15%, the thickness of the light-absorbing film as the first layer is required to be at most 30 nm (since the reflection at the glass/surface treating film interface increases as the film thickness increases), and Tf at that time becomes substantially at least 60%. On the other hand, in order to make the surface resistance to be at most 1 k$\Omega$/□ while maintaining the low reflection characteristics on the film face side, the thickness of the light-absorbing film as a first layer is required to be at least 5 nm, and Tf at that time will be substantially at most 90%. Tf is particularly preferably from 60 to 85%.

As the CRT panel to be used in the present invention, preferred is a flattened CRT panel having such a curvature radius that the outer diameter of the panel is at least 5 times the R value as calculated by the mathematical expression (2):

Value R (unit: mm)=screen diagonal length (inch)×42.5+45.0 mathematical expression (2)

wherein the screen diagonal length is represented as effective picture plane size (inch) of the display.

The CRT panel produced by the present invention, even if it is a flattened CRT panel, has a value A of the above expression (1) of less than 1, as mentioned above, whereby the transmittance of the CRT panel is corrected, and the uniformity of the transmittance is accomplished.

With a CRT provided with the CRT panel produced by the present invention, an image of uniform brightness can be viewed with a good contrast, and there will be substantially no occurrence of a double image.

Now, the more preferred embodiments will be described below.

With respect to the light-absorbing film 12, its film thickness is adjusted so that it has such a light transmittance distribution that, of the overall light transmittance Tgf of both the above substrate glass 11 and the surface treating film, the overall light transmittance Tgf(0) at the center portion of the image display plane 11a and the overall light transmittance Tgf(E) at the diagonal line top end satisfy Tgf(E)/Tgf(0)≧90%. Specifically, as illustrated in FIG. 8, the light-absorbing film 12 has a film thickness distribution of an approximately "semicylindrical shape" wherein it is thickest at the center portion and gradually becomes thin towards the periphery. However, the maximum film thickness is at a level of a few tens nm.

Figure 9:
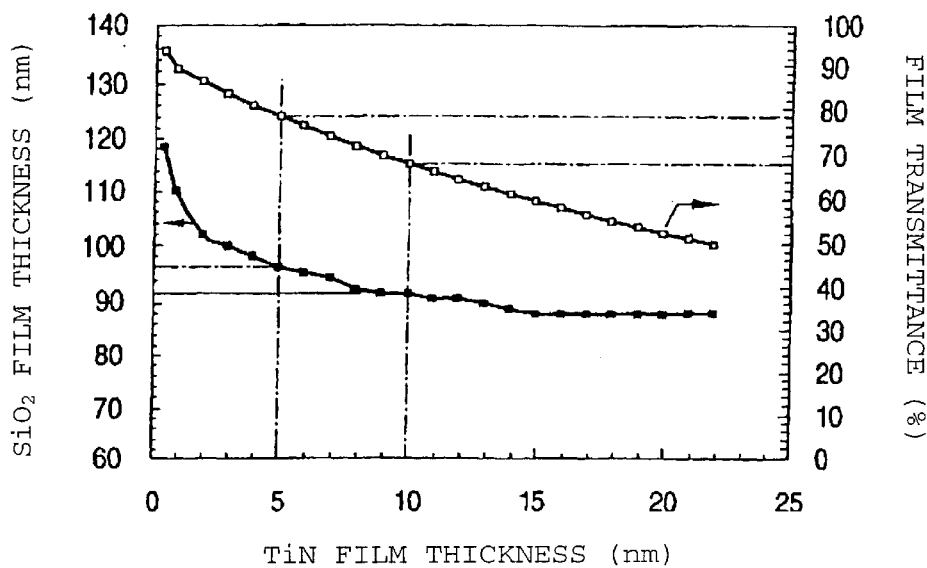
FIG. 9 is a graph illustrating simulation of a change in the light transmittance by the film thickness of a silica film (low refractive index film).

FIG. 9 illustrates, with respect to a sample comprising a glass flat plate and a titanium nitride film (light-absorbing film) and a silica film (low refractive index film) formed on this order on the glass flat plate, the thickness of the silica film which shows an optimum low reflection performance at each film thickness of the titanium nitride film. Here, the film transmittance Tf is obtained from Tf=Tgf/Tg by measuring the light transmittance Tg of the glass itself and then measuring the overall light transmittance Tgf.

From the above results, for example, in a case where a film transmittance of 78% is required, the film thickness of the titanium nitride film is made to be about 5 nm, and the film thickness of the silica film is made to be about 96 nm, whereby an optimum low reflection performance can be obtained. Further, as another example, in a case where a film transmittance of 68% is required, the film thickness of the titanium nitride film is made to be about 10 nm, and the film thickness of the silica film is made to be about 92 nm.

When this simulation result is applied to the light-absorbing film 12 having a film thickness distribution as illustrated in FIG. 8, the low refractive index film 13 has such a film thickness distribution that it is thinnest on the light-absorbing film 12 which is located at the center portion of the image display plane 11a and is thickest, and becomes thick towards the diagonal line top end, as illustrated in the figure.

As mentioned above, by forming the light-absorbing film 12 and the low refractive index film 13 to have film thickness distributions respectively, a panel glass can be obtained wherein the light transmittance is substantially constant over the entire surface of the image display plane 11a, and the film face reflectance Rf(0) at the center portion of the image display plane 11a and the film face reflectance Rf(E) at the diagonal line top end satisfy |Rf(0)–Rf(E)|≦0.5%, i.e. the reflectance is substantially constant over the entire surface of the image display plane 11a.

Further, it is particularly preferred to adjust the film thicknesses of the light-absorbing film 12 and the low refractive index film 13 to obtain the following characteristic value. By further satisfying such essentialities, non-uniformity of the brightness and reflection of an image can further be suppressed, and an excellent image can be displayed.

Rf(E) is practically required to be at most 1.5%, particularly at most 0.7%, so that the reflection of a white light on the image is not irritating.

The numerical value of ATf is preferably at least 2% and at most 25%. If it is less than 2%, the transmittance correction effect is inadequate, and if it exceeds 25%, a problem such as color shading tends to be elicited.

In the film construction employing a titanium nitride film and a silica film, the range of Tf is preferably at least 60% and at most 90%. If it is less than 60%, the reflection from the substrate glass side tends to be high, whereby a problem of a double image is likely to occur, and if it exceeds 90%, the low reflection performance tends to be inadequate.

The above panel glass 10 of the present invention can be applied to a CRT e.g. a display for computers, and with a CRT provided with the panel glass of the present invention, brightness and contrast are uniform over the entire surface of the image display plane, and reflection is low and reflection of an image can be suppressed, whereby an excellent image can be displayed.

The present invention also relates to a method for producing a CRT by using the above panel glass. Namely, the above panel glass (a panel glass having a surface treating film formed on the surface) is preliminarily prepared, a black matrix, a phosphor and an aluminum bag are coated on the inside of said panel glass, and components for CRT (a funnel glass, an electron gun and a neck tube) are incorporated thereto to prepare a CRT.

Otherwise, in production of a CRT, a surface treating film may be formed as mentioned above on an image display plane (outer surface of the panel glass) of a CRT completed by incorporating components for CRT (a funnel glass, an electron gun and a neck tube) to a panel glass having a black matrix, a phosphor and an aluminum bag coated on the inside.

EXAMPLES

Now, the present invention will be explained specifically with reference to Examples However, the scope of the present invention is not restricted by the Examples.

In the following Examples, the transmittance was measured as follows.

By a transmittance meter corrected so that the transmittance by air would be 100%, Tg and Tgf were measured, and Tf was obtained as a measured value based on the calculation of Tgf/Tg.

The reflectance was measured by means of a MPCD reflectance measuring apparatus manufactured by Otsuka Electronics Co., Ltd.

Example 1

When a tint glass of 19 inch size is used, a flat panel glass (longitudinal direction: 400 mm, width direction: 300 mm, R value: 850 mm, panel outer diameter: 4300 mm) has a transmittance of the glass itself of 45.8% at the panel center portion and a glass transmittance of 40.0% at the periphery specified position within the effective picture plane (coordinate position x=±155 mm, y=±90 mm when the panel center portion coordinates are x=y=0). Further, the glass transmittance is 38% at an effective plane end portion (x=±180 mm, y=±135 mm).

In a case of this panel glass, the final overall transmittance (transmittance of both a glass and a surface treating film) is designed so that the overall transmittance will be 37.0% at each position of the panel glass after the surface treatment, in order to improve brightness ratio and contrast as a CRT. As the results of simulation, the film transmittance is about 81% at the center portion, about 92.5% at the peripheral specified position (peripheral portion) and 97% at the effective plane end portion. Here, by necessity for conducting the transmittance correction and by the necessity to make a good low reflection performance appear, on a glass substrate, a titanium nitride film (conductive film for transmittance correction), a silicon nitride film (anti-oxidizing film) and a silica film (a film to obtain low reflection performance and to improve durability) were formed in this order from the glass side. In such a case, as targets to be used, a Ti target for the titanium nitride film and a polycrystal Si target for the silicon nitride film and silica film, were prepared. Firstly, a film is formed so that the film transmittance at the center portion will be 81%, the film transmittance at the peripheral specified position will be 92% and the effective plane end portion will be 97%, by controlling the thickness of the titanium nitride film as a first layer for conducting transmittance correction. A baffle plate shape was designed by simulation so that the overall transmittance distribution would be constant at about 37.0% at each position. Further, the distance between the surface of the panel glass (outer surface display plane) and the baffle plate was 30 mm. Further, as illustrated in FIG. 1, a pair of baffle plates having such a shape that the long side b was 440 mm which is the sum of the length 400 mm which is the same as the length of the panel glass in a longitudinal direction and 20 mm each on top and below, the upper side a and the lower side c were 100 mm each, and the curvature radius of the arc d was about 400 mm, was disposed between the panel glass and each cathode of an in-line type vertical sputtering apparatus so that X1 would be 300 mm and X2 would be 200 mm. Namely, the panel glass and the baffle plates were maintained so that their longitudinal directions were parallel to each other and parallel in the direction of gravity, and the setting direction of the panel glass and the baffle plates was vertical so that film forming particles were adhered to the outer surface of the panel glass from an approximately vertical direction while moving the panel glass vertically in the direction of gravity.

The curvature radius of the baffle plates was determined by the glass transmittance distribution of the CRT panel to be applied. Here, baffle plates made of aluminum having a uniform curvature radius were employed.

After evacuation to $2.66 \times 10^{-3}$ Pa, 200 sccm of Ar gas and 150 sccm of $N_2$ gas were introduced, the discharge pressure was set to 0.332 Pa, and a titanium nitride film as a first layer (containing a trace amount of oxygen) was formed by means of a DC magnetron cathode with an introduction power of 9.2 kW at a carrier rate of the CRT panel of about 1.0 m/min.

At that time, the thickness of the titanium nitride film at the center portion was about 7 nm, the film thickness at the peripheral portion was about 4 nm, and the film thickness at the effective plane end portion was about 2 nm.

For the silicon nitride film and the silica film as the second and third layers, an optimum baffle plate design is required in the same manner as in the first layer so that they provide final low reflection performance. The shape of the baffle plates and the film formation conditions of the second and third layers are shown in the following Table 1 in order. As the baffle plates, pairs of ones having the same shape as illustrated in FIG. 2 were used for the respective formations of the films as the second and third layers. of the silicon nitride film as the second layer, the thickness at the center portion was about 3 nm, the film thickness at the peripheral portion was about 5 nm, and the film thickness at the effective plane end portion was about 6 nm. Of the silica film as the third layer, the thickness at the center portion was about 96 nm, the film thickness at the peripheral portion was about 105 nm, and the film thickness at the effective plane end portion was about 110 nm.

TABLE 1

|  | SiN film | $SiO_2$ film |
|---|---|---|
| Distance between baffle plate and panel glass | 30 mm | 30 mm |
| Baffle plate long side b | 440 mm | 440 mm |
| Baffle plate maximum width e | 20 mm | 20 mm |
| Curvature radius of the baffle plate arc d | 600 mm | 450 mm |
| X1 | 240 mm | 200 mm |
| X2 | 260 mm | 260 mm |
| Degree of vacuum after evacuation | 0.399 Pa | 0.399 Pa |
| Introduction gas |  |  |
| Ar amount | 200 sccm | 200 sccm |
| $N_2$ amount | 150 sccm | — |
| $O_2$ amount | — | 120 sccm |

TABLE 1-continued

|  | SiN film | $SiO_2$ film |
|---|---|---|
| Discharge pressure | 0.332 Pa | 0.266 Pa |
| Cathode | DC magnetron | AC magnetron |
| Carrier rate | 1.0 m/min | 1.0 m/min |

The film characteristics of the transmittance-corrected CRT panel prepared under these conditions are as follows.

|  | Center portion | peripheral portion | Effective plane end portion |
|---|---|---|---|
| Overall transmittance | 37.0% | 36.8% | 36.5% |
| Average reflectance (450–650 nm) | 0.35% | 1.2% | 1.5% |
| Maximum reflectance (450–650 nm) | 1.5% | 2.5% | 3.1% |
| Visible light reflectance | 0.3% | 1.1% | 1.4% |
| Surface resistance (Ω/□) | 250 Ω/□ | 550 Ω/□ | 770 Ω/□ |

With respect to the characteristics of the CRT with the product of the present invention, the conventional brightness ratio as between the center and the periphery decreased, the contrast was good, and no double image occurred. The results of e.g. overall transmittance including the glass and the surface treating film at each position of each of a conventional CRT panel (Comparative Example) and the CRT panel of the present invention are shown in Tables 2 and 3 in order. Here, as a conventional product, a CRT panel was prepared in the same manner as mentioned above except that the film distribution was not corrected, and films were formed with uniform film thicknesses of such that the film thickness of the first layer was about 7 nm, the film thickness of the second layer was about 3 nm and the film thickness of the third layer was about 96 nm. Further, the center portion was a position where the coordinate position x=±100 mm and y=±60 mm.

TABLE 2

(Comparative Example)

| Positions in a longitudinal direction | Center portion | Intermediate portion | peripheral portion | Effective plane end portion |
|---|---|---|---|---|
| Tg | 45.8 (max) | 43.3 | 40.0 | 38.0 (min) |
| Tf | 81.0 | 81.0 | 81.0 | 81.0 |
| Tgf | 37.1 (max) | 35.1 | 32.4 | 30.8 (min) |
| Tgf (min)/Tgf (max) | 0.873 |  |  |  |
| A value | 1.00 |  |  |  |
| Rf | 0.3% | 0.3% | 0.3% | 0.3% |

TABLE 3

(product of the present invention)

| Positions in a longitudinal direction | Center portion | Intermediate portion | peripheral portion | Effective plane end portion |
|---|---|---|---|---|
| Tg | 45.8 (max) | 43.3 | 40.0 | 38.0 (min) |
| Tf | 81.0 | 85.2 | 92.0 | 97.0 |
| Tgf | 37.1 (max) | 36.9 | 36.8 | 36.8 (min) |

TABLE 3-continued (product of the present invention)

| Positions in a longitudinal direction | Center portion | Intermediate portion | Effective peripheral portion | plane end portion |
|---|---|---|---|---|
| Tgf (min)/Tgf (max) | | 0.992 | | |
| A value | | 0.06 | | |
| Rf | 0.3% | 0.7% | 1.1% | 1.4% |

Further, results similar to the above were obtained with respect to the product of Comparative Example and the product of the present invention obtained by applying the same treatment as mentioned above to a CRT having the same size instead of the above flat panel glass.

Instead of the above flat panel glass, a flat panel glass having a length in a longitudinal direction of 420 mm, a length in a width direction of 335 mm, an R value of 850 mm and a panel outer diameter of 4300 mm, and having the same glass transmittance at each position as the above flat panel glass, was used, and the same treatment as mentioned above was applied, whereupon results similar to the above were obtained. Here, the long side b of the used baffle plates used was 460 mm.

Further, instead of the above "vertical" sputtering, a deposition-up system sputtering was carried out, whereupon similar results were obtained.

Example 2

A flat panel made of a tint glass of 19 inch size (long diameter portion: 430 mm, short diameter portion: 300 mm, curvature radius of an image display plane: 4300 mm, curvature radius on the rear surface: 850 mm) was used as a substrate glass. Of the substrate glass, the light transmittance Tg(0) at the center portion (point of intersection of diagonal lines) on an image display plane was 53.6%, and the light transmittance Tg(E) at a point where the coordinate position x=±162 mm and y=±117 mm when the coordinates at the above center portion were x=y=0 (hereinafter referred to as "effective plane end portion") was 45.0%. Then, by using this substrate glass, film design was carried out so that the final overall light transmittance Tgf including the surface treating film would be such that Tgf(0) at the center portion would be 40.0%, and Tgf(E) at the effective plane end portion would be 36.5%. As illustrated in FIG. 9, with respect to the film transmittance Tf of the surface treating film, Tf(0) at the center portion was 74.6%, and Tf(E) at the effective plane end portion was 81.1%. Further, a titanium nitride film was selected as a light-absorbing film, a silica film was selected as a low refractive index film, and a silicon nitride film was selected as an oxidation barrier layer.

Firstly, a titanium nitride film was formed so that the film thickness at the center portion of the image display plane would be about 7.5 nm (transmittance of the film itself: 75%), the film thickness would be about 4.8 nm at the effective plane end portion (transmittance of the film itself: 80%), and the film thickness would uniformly decrease from the center portion to the effective plane end portion. Then, a silicon nitride film was formed uniformly in a film thickness of 3 nm on the entire surface of the titanium nitride film. A silica film was formed thereon so that the film thickness at the center portion would be about 93 nm and the film thickness at the effective plane end portion would be about 98 nm, and the film thickness would uniformly increase from the center portion to the effective plane end portion.

Film formation was carried out by using an in-line type sputtering apparatus with which a continuous film formation can be carried out. A metal titanium target and metal silicon were disposed to a first film formation chamber, and a DC magnetron planer type target was employed. Firstly, the substrate glass was disposed in the first film formation chamber, followed by evacuation until the entire back pressure became $2.7 \times 10^{-3}$ Pa. Then, 200 sccm of argon and 70 sccm of nitrogen gas as a discharge gas were introduced into the inside of the chamber, and as the discharge pressure, conductance was set to 0.33 Pa. Then, a direct-current voltage of 9.3 kW (electrical power density was about 4.0 W/cm$^2$) was applied to the titanium target to form a titanium nitride film, and then 13.5 kW of a direct-current voltage was applied to the silicon target in the same atmosphere to form a silicon nitride film. The carrier rate of the substrate glass was about 1.00 m/min at that time. Here, baffle plates as illustrated in FIG. 1 were used for formation of the titanium nitride film.

Then, the substrate glass on which the titanium nitride film and the silicon nitride film were formed, was transferred to a second film formation chamber to which a metal silicon target was disposed, followed by evacuation until the back pressure of the entire second film formation chamber became $2.5 \times 10^{-3}$ Pa. Then, 200 sccm of argon and 150 sccm of an oxygen gas were introduced as discharge gas into the inside of the chamber, and as a discharge voltage, the conductance was set to 0.33 Pa. Then, an electrical power with a frequency of about 40 kHz was applied to the silicon target by using an AC power source to form a silica film. The carrier rate of the substrate glass was about 1.00 m/min at that time. Here, for film formation, baffle plates as illustrated in FIG. 2 were employed.

With respect to the obtained panel glass, the film face reflectance Rf was measured, whereupon Rf(0) at the center portion was 0.1% and Rf(E) at the effective plane end portion was 0.4%.

A construction and film thickness distribution of the surface treating film of the panel glass prepared in Example 2 and optical characteristics were listed below.

| | | |
|---|---|---|
| Light transmittance of substrate glass Tg (%) | 53.6 | 45.0 |

[Construction and film thickness of the surface treating film (nm)]

| | | |
|---|---|---|
| Titanium nitride film | 7.5 | 4.8 |
| Silicon nitride film | 3.0 | 3.0 |
| Silica film | 93.0 | 98.0 |
| Overall light transmittance Tgf (%) | 40.0 | 36.5 |
| Film transmittance Tf (%) | 74.6 | 81.1 |
| ATf (%) | | 6.5 |
| Film face reflectance Rf (%) | 0.1 | 0.4 |
| ARf (%) | | 0.3 |

The same operation as in the above Example was carried out except that the design was changed so that the effective plane end portion was x=±185 mm and y=±135 mm, whereupon similar results were obtained.

Example 3

A substrate glass similar to Example 2 was prepared except that the film thickness distribution of the substrate glass was different. Then, a titanium nitride film, a silicon nitride film and a silica film were formed on the image display plane while adjusting the film thicknesses as shown bellow, so that the final overall light transmittance including the surface treating film Tgf would be such that Tgf(0) at the center portion would be 40.0% and Tgf(E) at the effective plane end portion would be 40.0% and they were the same. In Example 3, a film thickness distribution was provided also to the silicon nitride film as illustrated in FIG. 13, as shown below. Film formation was carried out by using the same in-line type sputtering apparatus as in Example 2, and each film was formed under similar film formation conditions except that the baffle plates used for film formation of the silica film were used at the time of film formation of the silicon nitride film.

A construction and a film thickness distribution of the surface treating film of the panel glass prepared in Example 3 and optical characteristics are listed below.

| Light transmittance of substrate glass Tg (%) | 52.4 | 46.0 |

[Construction and film thickness of the surface treating film (nm)]

| Titanium nitride film | 7.8 | 2.0 |
| Silicon nitride film | 3.0 | 30.0 |
| Silica film | 94.0 | 102.0 |
| Overall light transmittance Tgf (%) | 40.0 | 40.0 |
| Film transrmittance Tf (%) | 76.4 | 87.0 |
| ΔTf (%) | | 10.6 |
| Film face reflectance Rf (%) | 0.2 | 0.6 |
| ΔRf (%) | | 0.4 |

The same operation as in the above Example was carried out except that the design was changed so that the effective plane end portion was x=±185 mm and y=±135 mm, whereupon similar results were obtained.

A CRT was practically prepared by using each of the panel glasses prepared in the above Examples 2 and 3, and an image was displayed, whereupon the brightness and contrast were uniform over the entire surface of the image display plane, reflection of an external image was small, and an easily viewable picture plane was obtained.

INDUSTRIAL APPLICABILITY

According to the present invention, a CRT panel, even if it is a flattened CRT panel, with which an image having a uniform brightness is seen with a good contrast, can be obtained with a simple and easy method at a low cost. According to the present invention, a CRT panel having also an electromagnetic wave shielding performance or a low reflection performance can also be provided. Further, a CRT panel having occurrence of a double image suppressed can also be provided. Further, a CRT panel having less reflection of an image can also be provided.

Further, with the CRT panel obtained by the present invention, a CRT having the above excellent characteristics can be provided.

The entire disclosures of Japanese Patent Application No. 2000-222482 filed on Jul. 24, 2000 and Japanese Patent Application No. 2000-363144 filed on Nov. 29, 2000 including specifications, claims, drawings and summaries are incorporated herein by reference in their entireties.

What is claimed is:

1. A method for producing a CRT panel glass or a CRT, which comprises disposing baffle plates between an outer surface of a CRT panel on which a film is formed and a sputter target, and forming a surface treating film on the outer surface of said panel by a sputtering method so that the value A defined by the following mathematical expression (1) is less than 1 within an effective picture plane on the outer surface of said panel:

$$A \text{ value} = \left| \frac{1 - \frac{Tgf \text{ (min)}}{Tgf \text{ (max)}}}{1 - \frac{Tg \text{ (min)}}{Tg \text{ (max)}}} \right| \quad (1)$$

In the above mathematical expression (1):
Tg(min) and Tg(max) represent the minimum transmittance (%) and the maximum transmittance (%) of the CRT panel itself, respectively; and
Tgf(max) and Tgf(min) represent the maximum transmittance (%) and the minimum transmittance (%) of an integrated body comprising the CRT panel and the surface treating film, respectively.

2. The method for producing a CRT panel glass or a CRT according to claim 1, wherein baffle plates having such a shape that the region on the outer surface of the CRT panel to which film-forming particles are adhered has such a width that the width in the outer surface width direction becomes narrow to narrow via broad continuously in a longitudinal direction of the CRT panel, are used.

3. The method for producing a CRT panel glass or a CRT according to claim 1, wherein film-forming particles are adhered on the surface treating film formed by the baffle plates as defined in claim 2, by using baffle plates having such a shape that the width in the outer surface width direction becomes broad to broad via narrow continuously in a longitudinal direction of the CRT panel.

4. A CRT panel glass or a CRT, which is obtained by the production method as defined in claim 3.

5. The CRT panel glass or the CRT according to claim 4, wherein the visible light reflectance against light incident from outside of the panel is at most 1.5% within the above effective picture plane.

6. A CRT panel glass, which comprises a surface treating film comprising a light-absorbing film and a low refractive index film laminated on the light-absorbing film, formed on an image display plane of a substrate glass having a flat image display plane and having such a light transmittance distribution that the light transmittance Tg(0) of the panel itself at the center portion of the flat image display plane and the light transmittance Tg(E) of the panel itself at a diagonal line top end corresponding to a panel effective plane end at each panel size as defined in accordance with individual standards by Electronic Industries Association of Japan EIAJ-2134B, satisfy "Tg(0)≧Tg(E)"; which has uch a light transmittance distribution that the overall ight transmittance Tgf(0) including the surface treating film at the center portion of the image display plane and the overall light transmittance Tgf(E) including the surface treating film at the diagonal line top end corresponding to the panel effective plane end at each panel size as defined in accordance with individual standards by Electronic Industries Association of Japan EIAJ-2134B, satisfy "Tgf(E)/Tgf(0)≧90%"; and which has such a reflectance distribution that the reflectance Rf(0) against light from the low refractive index film panel side at the center portion of the image display plane and the reflectance Rf(E) against light from the low refractive index film side at the diagonal line top end corresponding to the panel effective plane end at each size as defined in accordance with individual standards by Electronic Industries Association of Japan EIAJ-2134B, satisfy "$|Rf(0)-Rf(E)| \leq 0.5\%$".

7. The CRT panel glass according to claim 6, wherein both Rf(0) and Rf(E) are at most 0.7%.

8. The CRT panel glass according to claim 6, wherein the difference between the light transmittance Tf(0) of the surface treating film alone at the center portion of the image display plane and the light transmittance Tf(E) of the surface treating film alone at the diagonal line top end corresponding to the panel effective plane end at each panel size as defined in accordance with individual standards by Electronic Industries Association of Japan EIAJ-2134B, $\Delta Tf=|Tf(0)-Tf(E)|$, is at least 2% and at most 25%.

9. The CRT panel glass according to claim 6, wherein both Tf(0) and Tf(E) are at least 60% and at most 90%.

10. The CRT panel glass according to claim 6, wherein the light-absorbing film is a film containing titanium nitride as the main component.

11. The CRT panel glass according to claim 6, wherein the low refractive index film is a film containing silica as the main component.

12. The CRT panel glass according to claim 6, wherein a layer which prevents oxidation of the light-absorbing film is interposed between the light-absorbing film and the low refractive index film.

13. The CRT panel glass according to claim 12, wherein the film thickness of the layer which prevents oxidation of the light-absorbing film is different as between the center portion of the image display plane and the diagonal line top end corresponding to the panel effective plane end at each panel size as defined in accordance with individual standards by Electronic Industries Association of Japan EIAJ-2134B.

14. A CRT having the CRT panel glass as defined in claim 6.

15. A method for producing a CRT, which comprises incorporating components for CRT into the CRT panel glass as defined in claim 6.

* * * * *